United States Patent Office 2,883,417
Patented Apr. 21, 1959

2,883,417

PREPARATION OF 5,8-DIHYDRO-1,4-NAPHTHO-HYDROQUINONE DIACYLATES

Van R. Gaertner, Dayton, Ohio, assignor to Monsanto Chemical Company, St. Louis, Mo., a corporation of Delaware No Drawing. Application February 24, 1954
Serial No. 412,382

7 Claims. (Cl. 260—479)

This invention relates to the preparation of dihydronapthohydroquinone diacylates. More particularly, it relates to a method of preparing 5,8-dihydro-1,4-naphthohydroquinone diacylates from 4a,5,8,8a-tetrahydro-1,4-napthoquinones in which one or both of the angular substituents are halogen atoms and in which said angular substituents are in cis-relationship to each other.

The preparation of the aforementioned diacylates according to the present invention is carried out by allowing a 4a,5,8,8a-tetrahydro-1,4-naphthoquinone having a cis-angular halogen substituent in one or both of the 4a and 8a positions to react with a carboxylic acid anhydride and a reducing metal, such as zinc, iron, tin, etc., or other metal located higher than hydrogen in the electromotive series. In a preferred embodiment of the present invention, the reaction is carried out in the presence of a catalytic amount of a tertiary amine.

The reaction may be represented as follows:

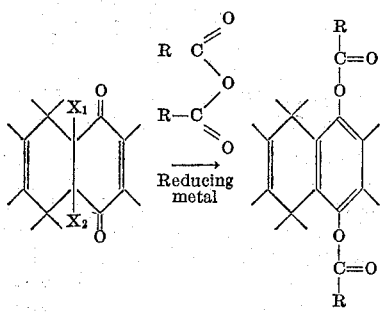

wherein $X_1$ is a halogen atom, $X_2$ is either a halogen atom or a hydrogen atom, and $X_1$ and $X_2$ are in cis-relationship to each other.

Examples of suitable napthoquinones for reaction according to the present invention are the cis-halo isomers of the following halotetrahydronaphthoquinones: 2,8a-dichloro - 7 - methyl - 4a,5,8,8a - tetrahydro - 1,4 - naphthoquinone; 4a,5,8,8a - tetrahydro - 2,4a,7 - trichloro-1,4 - naphthoquinone; 2,4a - dibromo - 5,8 - methano-4a,5,8,8a - tetrahydro - 1,4 - naphthoquinone; 2,4a - dichloro - 4a,5,8,8a - tetrahydro - 1,4 - naphthoquinone; 2,4a - dichloro - 6 - methyl - 4a,5,8,8a - tetrahydro-1,4 - naphthoquinone; 4a,5,8,8a - tetrahydro - 2,3,4a-trichloro - 1,4-naphthoquinone; 2,3,4a,8a - tetrachloro - 4a,5,8,8a-tetrahydro - 1,4 - napthoquinone; 6,7-dimethyl-2,3,4a,8a - tetrachloro - 4a,5,8,8a - tetrahydro - 1,4-naphthoquinone; 4a,9a - dichloro - 1,4,4a,9a - tetrahydro-9,10-anthraquinone; and the like.

The foregoing and other similar naphthoquinones can be readily obtained by a Diels-Alder reaction involving dienes and halo-1,4-benzoquinones. This preparation is particularly useful because it utilizes readily available raw materials, can be easily carried out, and results in adducts which have the angular substituents in cis-relationship to each other. Examples of suitable dienes for the preparation of such adducts are butadiene-1,3; n-pentadiene-1,3; isoprene; 2,3-dimethyl pentadiene-1,3; chloroprene or its bromo or iodo analogues, 2-ethylbutadiene-1,3; cyclopentadiene; gem-dichlorocyclopentadiene; 1-acetoxybutadiene-1,3, and the like. Examples of halobenzoquinones suitable for adduct formation with the aforementioned dienes are chloranil (2,3,5,6-tetrachloro-1,4-benzoquinone), 2,5-dichloro-1,4-benzoquinone; 2,3-dibromo-1,4-benzoquinone; 2-methyl-3,5,6-trichloro-1,4-benzoquinone; 2-chloro-1,4-naphthoquinone; 4a,8a-dichloro-4a,5,8,8a-tetrahydro-1,4-naphthoquinone; and the like. Since the angular substituents of the tetrahydronaphthoquinone adduct to be acylated by the process of the present invention must be either a pair of halogen atoms or a halogen atom and a hydrogen atom, it is apparent that one of the carbon atoms of the benzoquinone nucleus used in forming the Diels-Alder adduct must contain a halogen atom, and that the adjacent carbon atom of the benzoquinone nucleus must contain either a halogen atom or a hydrogen atom. However, from the foregoing description and from the examples which follow hereinafter, it should be equally apparent that the remainder of the benzoquinone nucleus as well as the adduct formed therefrom can be substituted with numerous other substituents without adversely affecting the course of the reaction of this invention.

Selection of the particular carboxylic acid anhydride for reaction according to the present invention will be dependent upon the particular diacylate which is desired as the product of the reaction. Examples of suitable anhydrides are the aliphatic acid anhydrides, either saturated or unsaturated, e.g., acetic anhydride, propionic anhydride, butyric anhydride, heptanoic anhydride, stearic anhydride, acrylic anhydride, oleic anhydride, etc.; aromatic acid anhydrides, e.g., benzoic anhydride, phthalic anhydride, etc.; cyclic anhydrides, e.g., maleic anhydride, succinic anhydride, and numerous others.

As indicated earlier the reaction of this invention can be advantageously carried out in the presence of a catalyst, namely a tertiary amine. Examples of suitable tertiary amines are the heterocyclic nitrogen compounds containing a tertiary nitrogen atom, such as pyridine, pyrimidine, oxazole, etc.; tertiary aliphatic and alicylic amines, such as trimethylamine, thiethylamine, trihexylamine, triisopropylamine, tricyclohexylamine, etc.; and aromatic amines or mixed aromatic and aliphatic amines, such as triphenylamine, N,N-dimethylaniline, and numerous others. The amounts of catalyst to be used can be varied through a considerable range depending upon the particular catalyst chosen, the specific reaction to be catalyzed and the degree of catalysis desired. In general, the catalyst concentration will run between about 0.01 weight percent and about 15 weight percent, and preferably between about 0.1 weight percent and about 10 weight percent, based upon the total weight of reactants present.

The present reaction between the chlorotetrahydroquinones, anhydrides and reducing metals can be conveniently carried out by forming a liquid solution of the chlorotetrahydroquinones and anhydrides and adding the metal in finely divided powder or dust form. When using normally liquid anhydrides, such as acetic anhydride, or anhydrides which can be melted at relatively low temperatures, it is possible and convenient to carry out the reactions by dissolving the chlorotetrahydroquinone in the anhydride and adding the finely divided metal to the solution. If one of aforementioned catalysts is used, it can be added to the solution along with the metal. In many cases the reaction begins spontaneously at room temperature without any necessity for heating. However, heat may be applied if it is desired to initiate and complete the reaction very rapidly. The reaction is exothermic, so that it is often necessary to intermix the reactants (and catalysts, if used) gradually in order to keep the temperature of the reaction mass from rising too rapidly. If desired or convenient—e.g., if the anhydride is a solid at room temperature—an inert liquid solvent or diluent can be utilized. Examples of suitable solvents are the aromatic and aliphatic hydrocarbons such as benzene, toluene, xylene, pentane, hexane, etc., ethers such as diethyl ether, diisopropyl ether, and the like.

In a particularly convenient and preferred embodiment of the present invention, the Diels-Alder adduct preparation is carried out in solution in a liquid anhydride which is to be reacted with the adduct. In this way it is possible to prepare the adduct, and then merely add the reducing metal (with or without catalyst) and carry out the reaction of the present invention without necessity for separating the Diels-Alder adduct from the solution in which it was prepared.

Further details relative to the processes involved in the present invention will be apparent from the following examples:

EXAMPLE 1

*Preparation of 2-chloro-5,8-dihydro-6,7-dimethyl-1,4-naphthohydroquinone diacetate*

Five and four-tenths grams of 2,4a-dichloro-6,7-dimethyl-4a,5,8,8a-tetrahydro-1,4-naphthoquinone was dissolved in about 32 g. of acetic anhydride, to which there was then added 2.5 g. of zinc dust and about 10 drops of pyridine. Upon addition of the pyridine a spontaneous exothermic reaction took place which caused the temperature of the reaction mixture to rise very quickly to about 80° C. A solid reaction product was formed, but was redissolved by adding 70 ml. of acetic acid and boiling. The excess zinc was then filtered from the solution, water was added to hydrolyze excess acetic anhydride, and the mixture was cooled to precipitate the chlorodihydrodimethylnaphthohydroquinone diacetate as a white crystalline solid. Further purification by recrystallization from methanol gave fine white needles, melting 159–160° C. *Analyses.*—Calculated (as $C_{16}H_{17}ClO_4$): C=62.24%, H=5.55%. Found: C=62.88%, H=5.83%. The yield of product was better than 84 percent, based upon dichlorodimethyltetrahydronaphthoquinone.

EXAMPLE 2

*Preparation of 2-chloro-5,8-dihydro-1,4-naphthohydroquinone diacetate*

To 20.4 g. of acetic anhydride there were added 8.85 g. of 2,4a-dichloro-4a,5,8,8a-tetrahydro-1,4-naphthoquinone and about 6 drops of pyridine. Upon adding 6.5 g. of zinc dust, a little at a time, and another 6 drops of pyridine, spontaneous exothermic reaction took place which rapidly raised the temperature of the reaction mixture to about 137° C. and gave a solid reaction product precipitate. This precipitate was redissolved by adding acetic acid and heating to the boiling point. The excess zinc was filtered from the reaction mixture and water was added to hydrolyze excess acetic anhydride. The mixture was then cooled and further diluted with water to precipitate white crystalline 2-chloro-5,8-dihydro-1,4-naphthohydroquinone diacetate, melting 103–106° C., in better than 88 percent yield (based on dichlorotetrahydronaphthoquinone). *Analyses.*—Calculated (as $C_{14}H_{13}O_4Cl$): C=59.90%, H=4.67%. Found, C=60.17%, H=4.87%.

EXAMPLE 3

*Preparation of 2,3-dichloro-5,8-dihydro-1,4-naphthohydroquinone diacetate*

Twelve grams of 2,3,4a,8a-tetrachloro-4a,5,8,8a-tetrahydro-1,4-naphthoquinone was dissolved in 20.4 g. of acetic anhydride, to which there were then added 6.6 g. of zinc dust (in small portions) and about 6 drops of pyridine. After a slight amount of heating, the reaction proceeded vigorously and exothermically with precipitation of a solid product. This product was redissolved by adding acetic acid and boiling, the excess zinc dust was removed by filtration, and water was added to hydrolyze excess acetic anhydride. The mixture was then cooled and further diluted with water to precipitate a better than 88 percent yield of 2,3-dichloro-5,8-dihydro-1,4-naphthohydroquinone diacetate which, after recrystallization from a mixture of chloroform and methanol, gave white flakes, melting 197–199° C. *Analyses.*—Calculated (as $C_{14}H_{11}Cl_2O_4$): C=53.35%, H=3.84%. Found: C=53.42%, H=4.05%.

EXAMPLE 4

*Preparation of 2,3-dichloro-5,8-dihydro-6-methyl-1,4-naphthohydroquinone diacetate*

The procedure of Example 3 above was repeated using 4 g. of 6-methyl-2,3,4a,8a-tetrachloro-4a,5,8,8a-tetrahydronaphthoquinone, 13 g. of acetic anhydride, 2.1 g. of zinc, and about 10 drops of pyridine. The product, 2,3-dichloro-5,8-dihydro-6-methyl-1,4-naphthohydroquinone diacetate, was obtained in 94.5 percent yield as cream colored crystals, melting 166–167.5° C. *Analyses.*—Calculated (as $C_{15}H_{14}Cl_2O_4$): C=54.73%, H=4.29%. Found: C=54.92%, H=4.37%.

EXAMPLE 5

*Preparation of 2,3-dichloro-5,8-dihydro-6,7-dimethyl-1,4-naphthohydroquinone diacetate*

The procedure of Example 3 was repeated using 10 g. of 6,7-dimethyl-2,3,4a,8a-tetrachloro-4a,5,8,8a-tetrahydro-1,4-naphthoquinone, 30.6 g. of acetic anhydride, 5 g. of zinc dust and about 20 drops of pyridine. The product, 2,3-dichloro-5,8-dihydro-6,7-dimethyl-1,4-naphthohydroquinone diacetate, was obtained in better than 97 percent yield as fine white needles, melting 239–241° C. *Analyses.*—Calculated (as $C_{16}H_{16}Cl_2O_4$): C=55.99%, H=4.70%. Found: C=56.27%, H=5.11%.

EXAMPLE 6

*Preparation of 2,3-dichloro-5,8-dihydro-5,7-dimethyl-1,4-naphthohydroquinone diacetate*

The procedure of Example 3 was repeated using 10 g. of 5,7-dimethyl-2,3,4a,8a-tetrachloro-4a,5,8,8a-tetrahydro-1,4-naphthoquinone, 30.6 g. of acetic anhydride, 5 g. of zinc and about 40 drops of pyridine. The product, 2,3-dichloro-5,8-dihydro-5,7-dimethyl-1,4-naphthohydroquinone diacetate was obtained in about 71 percent yield as white prisms, melting 136–137.5° C. *Analyses.*—Calculated (as $C_{16}H_{16}Cl_2O_4$): C=55.99%, H=4.70%. Found: C=56.49%, H=5.00%.

EXAMPLE 7

*Preparation of 2,3-dichloro-5,8-dihydro-5,8-methano-1,4-naphthohydroquinone diacetate*

The procedure of Example 3 was repeated using 6.2 g. of 5,8-methano-2,3,4a,8a-tetrachloro-4a,5,8,8a-tetrahydro-1,4-naphthoquinone, 20.4 g. of acetic anhydride, 3.3 g. of zinc dust and some pyridine. The product, 2,3-dichloro-5,8-dihydro-5,8-methano-1,4-naphthohydroquinone diacetate was obtained in better than 97 percent yield as white needles, melting 131–132° C. *Analyses.*—Calculated (as $C_{15}H_{12}Cl_2O_4$): C=55.06%, H=3.70%. Found: C=55.29%, H=3.69%.

EXAMPLE 8

*Preparation of 2,3-dichloro-5,8-dihydro-6,7-dimethyl-1,4-naphthohydroquinone diacetate with tri-n-hexylamine catalyst*

The general procedure of Example 3 was repeated using 3.28 g. of 5,7-dimethyl-2,3,4a,8a-tetrachloro-4a,5,8,8a-tetrahydro-1,4-naphthoquinone, 20.4 g. of acetic anhydride, 1.6 g. of zinc and 80 drops of tri-n-hexylamine as a catalyst. The product, 2,3-dichloro-5,8-dihydro-6,7-dimethyl-1,4-naphthohydroquinone diacetate with tri-n- hexylamine catalyst was obtained in substantially quantitative yield (based on naphthoquinone).

EXAMPLE 9

*Preparation of 2,3-dichloro-5,8-dihydro-6,7-dimethyl-1,4-naphthohydroquinone diacetate with dimethylaniline catalyst*

The procedure of Example 8 was repeated except that 20 drops of dimethylaniline was used instead of the tri-n-hexylamine. A yield of about 85 percent (based on naphthoquinone) was obtained.

I claim:
1. The method of preparing an α-halo-5,8-dihydro-1,4-naphthohydroquinone diacylate, which method comprises contacting (1) a 4a,5,8,8a-tetrahydro-1,4-naphthoquinone containing at least two halogen atoms in positions alpha to a keto group, at least one but no more than half of said α-halogen atoms being angular substituents in cis-relationship to the other angular substituent, with (2) a carboxylic acid anhydride and (3) a reducing metal, in the presence of an effective catalyzing amount of a tertiary amine catalyst.

2. The method of preparing a 2,3-dihalo-5,8-dihydro-1,4-naphthohydroquinone diacylate, which method comprises contacting (1) a 2,3,4a,8a-tetrahalo-4a,5,8,8a-tetrahydro-1,4-naphthoquinone having the 4a- and the 8a-angular halogen atoms in cis-relationship to each other, with (2) an aliphatic carboxylic acid anhydride and (3) a reducing metal, in the presence of an effective catalyzing amount of a tertiary amine catalyst.

3. The process of claim 2 wherein the aliphatic carboxylic acid anhydride is a fatty acid anhydride, the reducing metal is zinc, and the tertiary amine is a heterocyclic tertiary amine.

4. The process of claim 2 wherein the aliphatic carboxylic acid anhydride is acetic anhydride, the reducing metal is zinc, and the tertiary amine is pyridine.

5. The method of preparing 2,3-dichloro-5,8-dihydro-1,4-naphthohydroquinone diacetate, which method comprises contacting (1) 4a,5,8,8a - tetrahydro-2,3,4a-trichloro-1,4-naphthoquinone having the 4a-chloro atom in cis-relationship to the 8a-hydrogen atom, with (2) acetic anhydride and (3) zinc, in the presence of a catalytic amount of pyridine.

6. The method of preparing 2-chloro-5,8-dihydro-1,4-naphthohydroquinone diacetate, which method comprises contacting (1) 2,4a - dichloro-4a,5,8,8a-tetrahydro-1,4-naphthoquinone having the 4a-chlorine atom in cis-relationship to the 8a-hydrogen atom, with (2) acetic anhydride and (3) zinc, in the presence of a catalytic amount of pyridine.

7. The method of preparing 2-chloro-5,8-dihydro-1,4-naphthohydroquinone diacetate, which method comprises contacting (1) 2,8a - dichloro-4a,5,8,8a-tetrahydro-1,4-naphthoquinone having the 8a-halogen atom in cis-relationship to the 4a-hydrogen atom, with (2) acetic anhydride and (3) zinc, in the presence of a catalytic amount of pyridine.

References Cited in the file of this patent
UNITED STATES PATENTS

| 2,609,376 | Ladd et al. | Sept. 2, 1952 |

FOREIGN PATENTS

| 710,131 | Germany | Sept. 4, 1941 |

OTHER REFERENCES

Diels et al.: Ber. der Chem. Gesell. 62 (1929), 2345.
Fieser et al.: "Organic Chemistry" (1950), 60, 819.